(12) United States Patent
Samodell

(10) Patent No.: US 6,420,680 B1
(45) Date of Patent: Jul. 16, 2002

(54) WELDER FOOT PEDAL

(75) Inventor: Ralph M. Samodell, Willoughby Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/795,094

(22) Filed: Mar. 1, 2001

(51) Int. Cl.[7] .................................................. B23K 9/10
(52) U.S. Cl. ........................................................ 219/132
(58) Field of Search .......................... 219/132, 130.1, 219/136, 137 R

(56) References Cited

U.S. PATENT DOCUMENTS

| | | | | |
|---|---|---|---|---|
| 2,349,891 A | * | 5/1944 | Tyrner | 219/132 |
| 2,379,774 A | * | 7/1945 | Wyer | 219/137 R |
| 2,383,725 A | * | 8/1945 | Landis et al. | 219/132 |
| 5,535,642 A | | 7/1996 | Moll | |
| 5,793,016 A | * | 8/1998 | Colling et al. | 219/132 |
| 5,864,117 A | * | 1/1999 | Kneisley et al. | 219/132 |

* cited by examiner

Primary Examiner—Clifford C. Shaw
(74) Attorney, Agent, or Firm—Vickers, Daniels & Young

(57) ABSTRACT

A control pedal for a welder that controls the output current level of the welder. The control pedal includes a foot pedal, a start switch, and a current level controller. The foot pedal is movable between an off position, an intermediate position, and a fully on position. The start switch initiates a startup sequence for the welder. The current level controller produces a signal that causes the output current level of the welder to vary between a minimum and a maximum current level. The foot pedal causes the start switch to begin the startup sequence prior to the foot pedal causing the current level controller to generate a signal which results in the output current level increasing above the minimum current level.

29 Claims, 3 Drawing Sheets

WELDER FOOT PEDAL

The invention pertains to a control mechanism for a welder and, more particularly, to a foot pedal for a welder that controls the output current level of the welder.

BACKGROUND OF THE INVENTION

Foot pedals are commonly used to control the output current level of a welder during a welding procedure. Typically, an operator depresses the foot pedal to increase the output welding current and releases the foot pedal to decrease the output welding current. The foot pedal provides a convenient way for the operator to control the output welding current while freeing the operator's hands for directing the welding electrode to a location to be welded. Furthermore, freeing the operator's hands enables the operator to use one hand to guide the electrode to a weld area and use the other hand to guide a consumable electrode to the weld area while using the foot pedal to control the output welding current. Foot pedals commonly include a start button to activate and deactivate the welder. Some types of welders, such as TIG welders, require the welder to proceed through a start-up sequence to initiate the arc prior to welding. Typically, the operator depresses the foot pedal to cause the start switch to activate thereby activating the pre start-up sequence of the welder. Once the pre start-up sequence is completed, the operator further depresses the pedal to increase the output current through the welding electrode.

Although the use of a foot pedal has simplified and enhanced the welding operation, present foot pedal designs have several disadvantages. For instance, current foot pedal controls combine the arc start switch and the output current control in a manner that makes it difficult for an operator to maintain a minimum welding output current after the start-up sequence has been completed. Typically, the operator depresses the foot pedal past the minimum output current level so as to ensure the start button is engaged and an output current at some low level is generated through the welding electrode after the start-up sequence has been completed. Another disadvantage is that when the operator releases pressure on the pedal to cause the output current to decrease, the operator can inadvertently over release the foot pedal, thereby causing the start button to be deactivated, resulting in the arc being extinguished. It is common practice for the operator to increase and decrease the welding current during a welding operation. During such welding operations, the foot is "rocked" on the pedal between a minimum and maximum position. During this "rocking" action, the operator can inadvertently decrease the pedal too much thereby causing the arc to extinguish. This inadvertent extinguishing of the arc can adversely affect the quality of the weld, and increase the difficulty of welding.

The inability for the operator to easily determine and maintain a minimum weld current position using a foot pedal also limits the ability of an operator to initiate various types of weld current shut down sequences.

In view of existing deficiencies of current foot pedal controls for welders, there is a need for a foot pedal control that enables an operator to better control the output current of a welder and/or to prevent inadvertent shut down of the welder during the welding operation.

SUMMARY OF THE INVENTION

The present invention pertains to an improved foot pedal control for a welder, and more particularly to a foot control for a TIG welder; however, the invention has broader applications and can be used as a foot and/or hand controller for a variety of welders or other electrical apparatus which require the welder and/or apparatus to be started prior to controlling the current and/or other electrical features of the welder and/or apparatus. The control pedal is designed to control the output current level of a welder in a convenient and efficient manner. The control pedal includes a pedal, a start switch and a current level controller. The pedal is movable between an off position, an intermediate position and an on position. The start switch is adapted to generate a start signal that initiates a start up sequence for the welder. Such start up sequence can include the start-up of an arc for a TIG welder, the start-up of a shielding gas control sequence, the start up of an electrode cooling sequence, the start-up of a consumable electrode feeder, and/or the like. The current level controller is adapted to generate a control signal which is used by the welder to produce an output current through the welding electrode. The control pedal is designed such that the start switch on the control pedal can be shifted from a deactivation position to an activation position prior to the current level controller generating a signal that causes the output current level of the welder to increase above a minimum level. Such an arrangement ensures a starting output current level consistency of the welder, thereby enhancing the performance of the welder. The off position of the pedal is defined as a position wherein the start switch of the control pedal is in the deactivation position. Typically, the deactivation position of the start switch results in the termination of the arc on the electrode of the welder. The intermediate position of the pedal is defined as the position wherein the start switch is shifted from the deactivated position to the activation position. The start switch in the activation position causes a signal to be sent to the welder to initiate the welder start up sequence such as, but not limited to, activating the arc at the welding electrode. The physical position of the pedal in the off position and intermediate position may be the same or different, depending on the particular design of the pedal, the position of the start switch and/or the particular design of the start switch. The intermediate position of the pedal is also defined as the position wherein the current level controller generates a control signal resulting in the output current level of the welder to be maintained at a minimum output current level. The on position of the pedal is defined as a position wherein the start switch is maintained in the activation position, and the output current level produces a control signal resulting in the output current level being maintained at some level above the minimum output current level and up to the maximum output current level of a welder.

In another aspect of the present invention, the control pedal is a foot pedal designed to receive at least a portion of a foot and to be moved by the foot to control the output current level of the welder. In one embodiment, the foot pedal moves by rotating or pivoting about a point and/or sliding along a surface at least during the movement of the pedal between the intermediate position and the on position. In one aspect of this embodiment, the foot pedal is designed to be pivoted about a point. In one specific arrangement, the foot pedal is designed to be depressed downwardly by the heel or ball of the foot to cause the pedal to move between the intermediate position and the on position. In another embodiment, the start switch on the foot pedal is designed and positioned such that the foot pedal does not physically move when shifted between the off position and the intermediate position. In one aspect of this embodiment, the start switch includes a depressable button, contact pad, sliding switch, or the like, located on the top surface of the foot pedal to enable the foot of the operator to activate and deactivate the start switch without having to move the foot pedal. In another embodiment, at least a portion of the foot pedal is moved when the foot pedal is moved between the off position and the intermediate position. In one specific arrangement, the foot pedal is designed so that the operator of the welder moves at least a portion of the foot pedal some distance to cause the start switch to shift between the deactivation position and the activation position.

In still another aspect of the invention, the control pedal includes a pedal that has at least two sections that are mountable such that the two sections move at least partially independently of one another. In one embodiment, one section of the pedal is moveable some distance without causing at least one other section of the pedal to move. In one aspect of this embodiment, the pedal includes a first section and a second section. The first section is adapted to cause the start switch to shift between an activation position and a deactivation position. The second position of the pedal is designed to cause the current level controller to generate a signal that results in the output current level to vary from a minimum current level to a maximum output current level. In one arrangement of this aspect, the first and second sections pivot about substantially the same point. In another arrangement of this aspect, the first and second section of the pedal pivot about a different pivot point. In still another embodiment, the first section is designed to perceive the ball or toe of a foot such that the ball or toe of the foot causes the first section to be depressed downwardly resulting in the start switch shifting from the deactivation position to the activation position. In such a design, the start switch is connected to or positioned under the bottom surface of the first section. Once the first section has been depressed sufficiently to cause the start switch to shift between the deactivation position to the activation position, further depression of the first section by the toe or ball of the foot results in the second section of the foot pedal to be depressed resulting in the pedal moving from the intermediate position to the on position. The movement of the second section of the foot pedal from an on position back to the intermediate position is accomplished by releasing the pressure on the first section and/or having the heel of the foot depress the first section to cause the desired movement of the first section.

In yet another aspect of the present invention, the pedal of the control pedal is a foot pedal which includes a heel section. The heel section is designed to inhibit or prevent the foot of an operator from slipping off the back end of the pedal and/or to maintain the foot of the operator in the proper position on the foot pedal. In one embodiment, the heel section includes an abutment flange, wherein the heel of a shoe or the heel of a foot can rest, thereby preventing the shoe and/or foot from slipping back on the foot pedal. In one aspect of this embodiment, the abutment flange has an arcuate shape to conform to the shape of the heel of a shoe or foot. In another embodiment, the heel section is moveable relative to a portion of the foot pedal to adjust the foot position of an operator on the foot pedal. In one aspect of this embodiment, the heel section is moveable along at least a portion of the end of the foot pedal to adjust the length of the foot pedal.

In still yet another aspect of the present invention, the pedal includes a safety engagement designed to inhibit movement of at least a portion of the pedal from the off position to the intermediate position. The safety engagement reduces or prevents inadvertent activation of the startup button by the operator. In one embodiment, the safety engagement resists the movement of the foot pedal until the operator exerts enough force on the foot pedal to overcome the countering force exerted by the safety engagement. In one specific design of this aspect, the foot pedal includes a first section and a second section, and the safety engagement is adapted to resist movement of the first section of the foot pedal which section is designed to shift the start switch between the activation and deactivation positions. In another aspect of this invention, the safety engagement includes a depressable pen which depresses after sufficient force has been applied to the pedal. In another embodiment, the safety engagement is designed to resist the movement of the pedal from the intermediate position to the off position. In this arrangement, the safety engagement reduces or prevents inadvertent deactivation of the start switch until the operator has fully or substantially removed the force being exerted on the pedal.

In a further aspect of the present invention, the pedal of the control pedal is biased in the off position. Such a biasing arrangement ensures that when the operator removes the force applied to the pedal, the pedal moves to the off position, thereby deactivating the welder.

The principal object of the present invention is to provide a control pedal that controls the output current level of a welder.

Another and/or alternative object of the present invention is to provide a control pedal which initiates a start sequence of the welder prior to causing the welder to increase the output current level above the minimum output current level.

Still another and/or alternative object of the present invention is to provide a control pedal which enables the operator to control the output current level of the welder without inadvertently deactivating the welder.

Yet another and/or alternative object of the present invention is to provide a control pedal which is adapted to be used by the foot of an operator.

Still yet another and/or alternative object of the present invention is to provide a control pedal which is adjustable to accommodate various foot sizes and/or foot positions of the operator on the foot pedal.

A further and/or alternative object of the present invention is to provide a control pedal which allows an operator to "rock" the pedal to cause the welding current to vary between a maximum and minimum current level without the concern of inadvertently extinguishing the arc.

Still a further and/or alternative object of the present invention is to provide a control pedal which allows an operator to maintain the current level at a minimum current level for a period time without the concern of inadvertently extinguishing the arc to enable an automatic arc shut down sequence.

These and other objects and advantages will become apparent to those skilled in the art upon the reading and following of this description taken together with the accompany drawings.

BRIEF DESCRIPTION OF THE DRAWINGS

Reference may now be made to the drawings, which illustrate various embodiments that the invention may take in physical form and in certain parts and arrangements of parts wherein.

DESCRIPTION OF THE PREFERRED EMBODIMENTS

Figure 1:
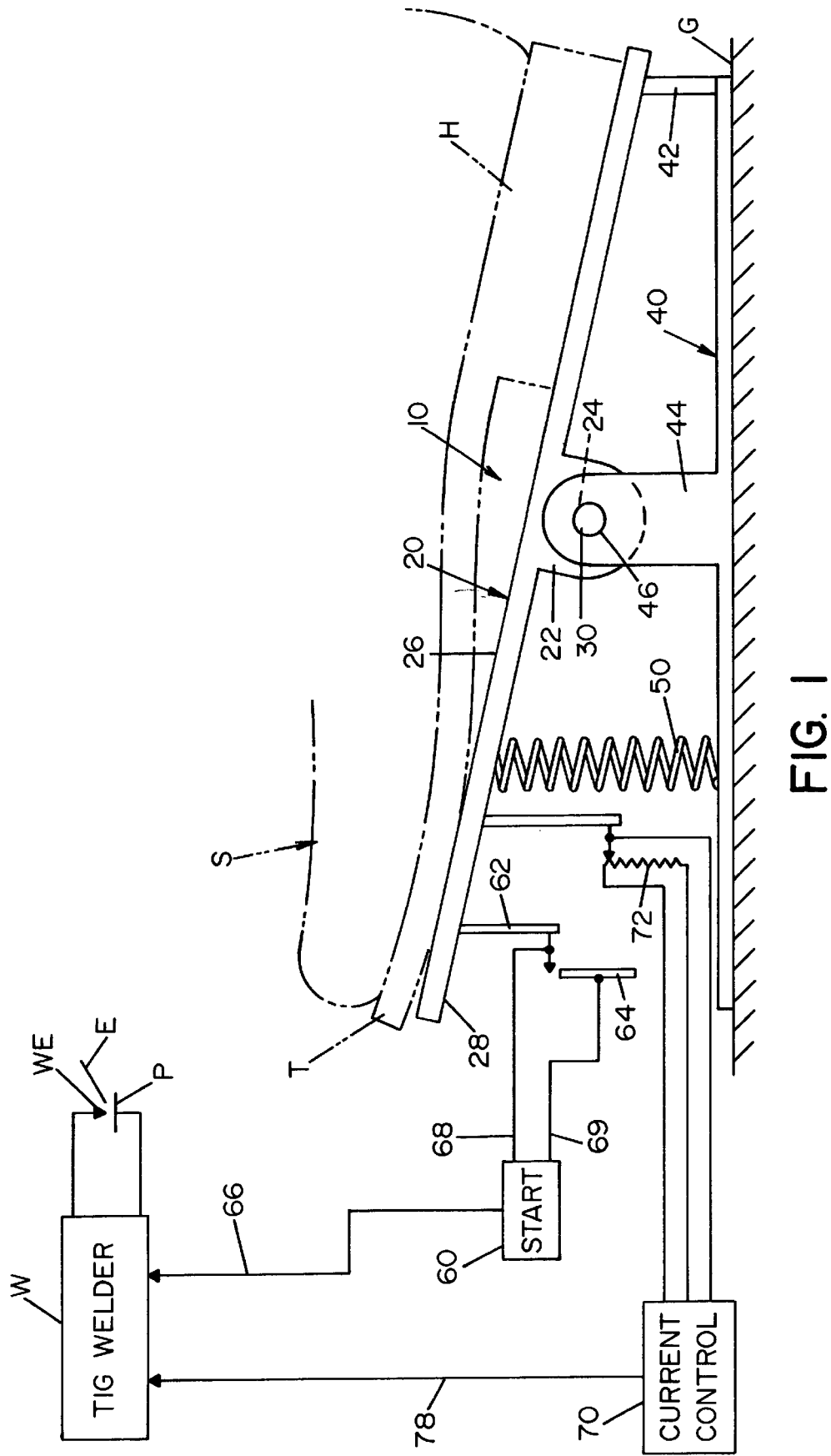
FIG. 1 is a pictorial illustration of a prior art foot control pedal.

Referring now to the drawings wherein the showings are for the purposes of illustrating a preferred embodiment of the invention only and not for the purpose of limiting same, FIG. 1 illustrates a prior art foot control designed to control output current of a welder. Pedal 10 includes a foot pad 20 that pivots on pedal base 40 lying on ground G. Foot pad 20 includes a top surface 26 and a bottom surface 28. Top surface 26 is adapted to support the toe T and the heel H of a shoe S of an operator. Foot pad 20 includes a pivot flange 22 having a flange opening 24 adapted to receive a pivot pin 30. Pivot pin 30 is inserted through flange opening 24 and leg opening 46 of pivot leg 44 of pedal base 40. Foot pad 20 pivots forwardly when the operator applies a downward force via toe T and a relieving force via heel H, and pivots backwardly when the operator reverses these actions. Pedal base 40 includes a stop flange 42 at the end of the base that limits the amount of clockwise rotation of foot pad 20 about pin 30 when the operator steps downwardly on the heel H. As a result, the pedal base "rocks" about pin 30. A pedal spring 50 is provided between the pad bottom surface 28 and pedal base 40 to cause the foot pad 20 to be biased in an off position. Connected to the bottom surface 28 of foot pad 20 is a switch pin 62 designed to form an electrical connection with switch contact wire 64 of start switch 60. A potentiometer 72 is also connected to the bottom surface 28 of foot pad 20. Potentiometer 72 is designed to send a variable strength signal to current control 70.

In operation, pedal 10 is maintained in the off position by pedal spring 50. When TIG welding is to begin, the operator shifts his or her weight on foot pad 20 increasing the force in toe T to cause foot pad 20 to pivot counter clockwise about pin 30. As foot pad 20 rotates counter clockwise, pedal spring 50 compresses. Upon continued counter clockwise rotation of pedal foot pad 20, switch pin 62 contacts switch contact wire 64, allowing a current to travel between switch wires 68 and 69. The circuit formed by switch pin 62 and switch contact wire 64 causes start switch 60 to send a signal through signal wire 66 to TIG welder W. Upon detection by TIG welder W of the start signal, TIG welder W begins the arc start sequence starting an arc between workpiece P and the welding electrode WE. Once the arc start up sequence is completed, the operator applies additional force through toe T to cause further counter clockwise rotation of foot pad 20 about pin 30. This further counter clockwise rotation causes the potentiometer to produce an increased signal which in turn causes current control 70 to send a current increasing control signal through control signal wire 78 to TIG welder W. As shown in FIG. 1, the farther downwardly the potentiometer is moved, the higher the signal to current controller 70 which in turn results in current control 70 to cause TIG welder W to increase the output current level between the current welding electrode and the workpiece. As shown in FIG. 1, a consumable electrode E can be used during the welding process.

One inherent design shortcoming of the control pedal of FIG. 1 is that potentiometer 72 moves some distance downwardly prior to switch pin 62 contacting switch contact wire 64. As a result, the operator cannot maintain a minimum output current level through TIG welder W at the time the arc start sequence has begun. In addition, the operator is unable to determine when the foot pad 20 has been rotated just enough to cause switch pin 62 to contact switch contact wire 64, thus cannot consistently maintain the same minimum output current level after each start-up sequence. Because the same foot action is used to start the arc and move the pedal to decrease or increase arc current, consistent current levels after arc start-up and/or the ability to maintain a minimum current arc is difficult, if not impossible, to consistently achieve. Furthermore, the control pedal design is such that an operator is unaware of when the minimum output current level is approaching prior to the operator deactivating the TIG welder. As a result, the operator can inadvertently deactivate the TIG welder while trying to minimize the output current through the TIG welder. This inadvertent deactivation of the arc commonly occurs when the control pedal is "rocked" during a welding operation.

Figure 2:
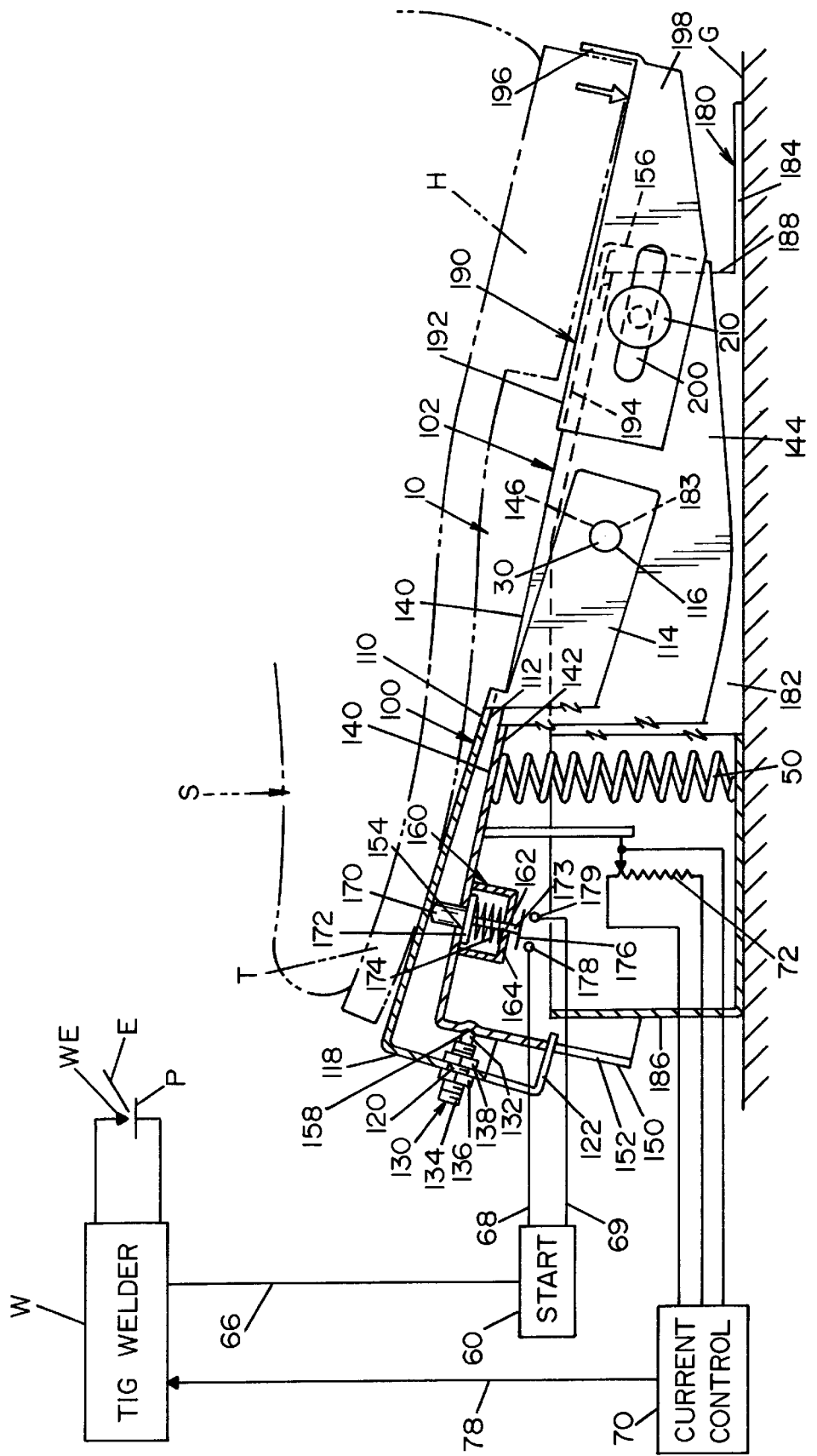
FIG. 2 is a pictorial view of the foot pedal of the present invention positioned in the off position.
Figure 3:
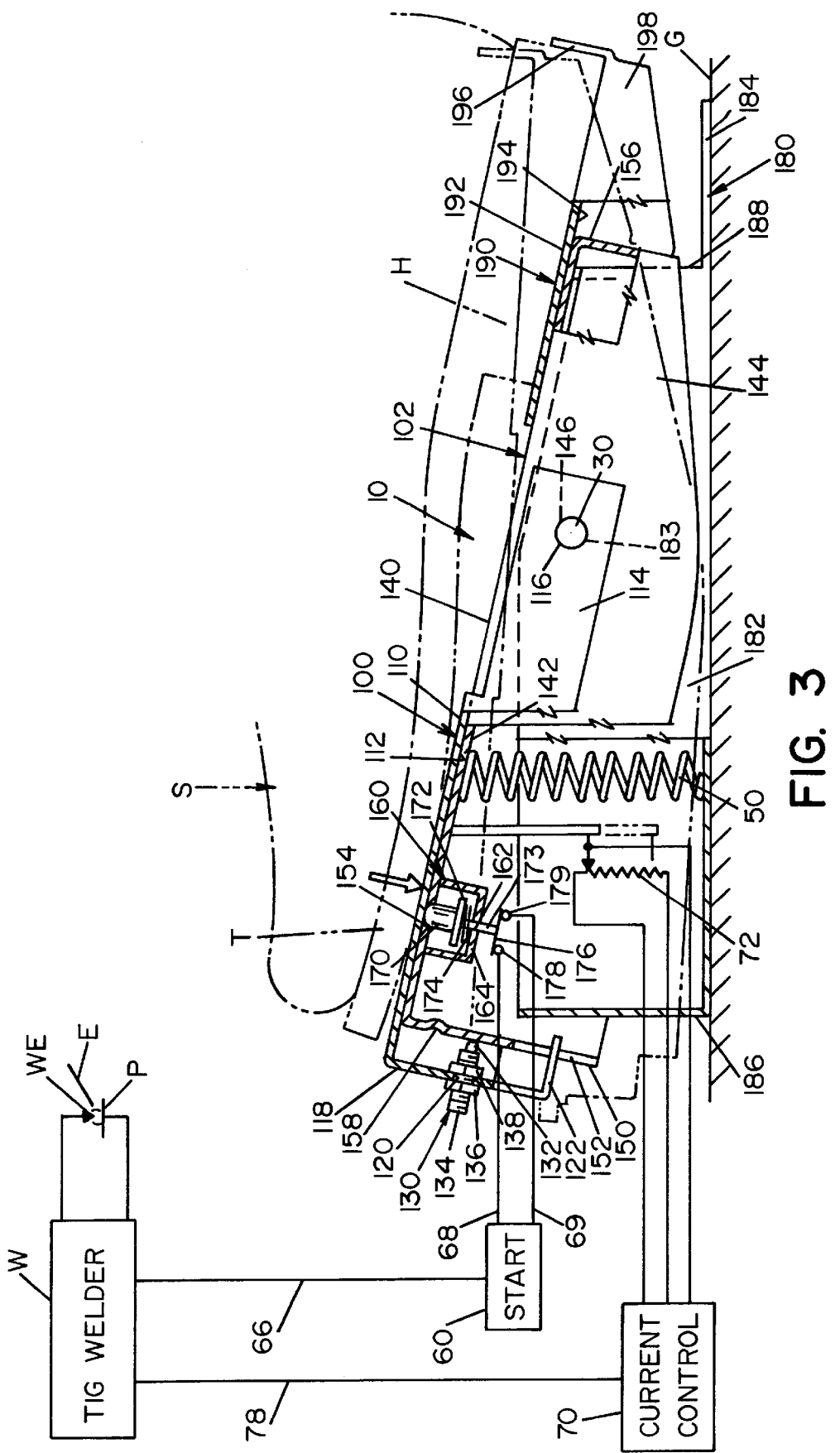
FIG. 3 is a pictorial view of the foot pedal of the present invention in the intermediate and on positions.

Referring now to FIGS. 2 and 3, the improved foot control pedal of the present invention is disclosed. Similar numbering in FIGS. 1, 2 and 3 have been used for common components. As shown in FIG. 2, pedal 10 includes a pedal front section 100 and a pedal back section 102. These two pedal sections are designed to pivot about a common point 30 and at least partially independently from one another. The pedal front section 100 includes a top surface 110, a bottom surface 112, and a side flange 114 which includes a flange opening 116. Pedal back section 102 also includes a top surface 140, a bottom surface 142, and a side section 144 which includes a side opening 146. Front section 100 is pivotally mounted on back section 102 about pin 30 which is inserted through flange opening 116 and side opening 146. Back section 102 also includes a pin opening 154 wherein a pin head 170 extends upwardly therethrough. Positioned below pin opening 154 and connected to the bottom surface 142 of back section 140 is a switch cage 160. Switch cage 160 includes a cage opening 162 and a cage base 164. Pin head 170 is biased upwardly by a pin spring 174 positioned between cage base 164 and pin base 172 of pin head 170. Pin base 172 is designed to have a cross-sectional shape which is larger than pin opening 154 to prevent the pin base from passing through pin opening 154. Connected to pin base 172 is a pin leg 173 which includes a pin contact 176 that extends beyond the bottom side of switch cage 160. Pin contact 176 is designed to contact wire contacts 178, 179 when pin head 170 is depressed downwardly by pedal front section 100.

Positioned at the front of pedal front section 100 is a posterior face 118 which includes a face opening 120 and a stop tab 122. Secured within the face opening 120 is a spring loaded depression pin 130. Depression pin 130 includes a pin head 132, a threaded body 134, which is positioned in face opening 120, and two securing nuts 136, 138 which securely mount threaded body 134 in face opening 120.

Pedal back section 102 also includes a posterior face 150, a slot 152 in the posterior face, and a pin depression 158. Pin depression 158 is adapted to receive the front end of pin head 132 of depression pin 130. Slot 152 is designed to enable stop tab 122 on pedal front section 100 to move downwardly when the pedal section is depressed and to define an upward stop position when pedal front section 100 moves upwardly. Typically, stop tab 122 abuts against the top of posterior face slot 152 at a point where pin head 132 engages pin depression 158.

Referring now to the rearward portion of pedal back section 102, there is provided a heel adjustment plate 190. Heel adjustment plate 190 is designed to adjustably slide along top surface 140 of pedal back section 102. Heel adjustment plate 190 includes a plate top face 192, a bottom face 194, and a slide flange 198 having a slot 200. Heel adjustment plate 190 is held to pedal back section 102 by plate bolt 210. The loosening of plate bolt 210 allows bottom face 194 of heel adjustment plate 190 to slide on the top surface 140 of pedal back section 102 to adjust the length of the overall pedal to facilitate different shoe sizes of the operator. Once the heel adjustment plate has been properly positioned, plate bolt 210 is tightened, thereby securing the heel adjustment plate in position relative to pedal back section 102.

As shown in FIGS. 2 and 3, pedal base 180 includes a base side 182, a base bottom 184, a front face 186, and a rear face 188. Base bottom. 184 provides stability to the pedal base when the operator operates the foot pedal. Base side 182 includes opening 146, which allows pin 30 to pass therethrough and to enable pedal back section 102 to pivot thereon. The top of front face 186 of pedal base 180 acts as a stop to limit the distance at which pedal back section 102 can be pivoted counter clockwise about pin 30.

The operation of the control pedal will now be described. Referring now to FIG. 2, pedal 10 is positioned in the off position. In this position, the operator has placed shoe S on pedal 10 and is exerting a downward force on the heel of the shoe as shown by the force arrow. The operator's toe T is positioned on the pedal front section 110 and the operator's heel is positioned on heel adjustment plate 190. The heel adjustment plate is adjusted by the operator prior to operating TIG welder W by loosening plate bolt 210 and sliding the heel adjustment plate on the back end of back section 102 until the desired position of the heel adjustment plate is obtained. The operator then tightens plate bolt 210 to secure heel adjustment plate 190 in position relative to back section 102.

As shown in FIG. 2, pedal 10 is rotated fully in the clockwise position relative to pedal base 180. Pedal spring 50, positioned between base bottom 184 and bottom surface 142 of back section 140, exerts an upward force to bias pedal 10 in the off position. Bottom surface 112 of pedal front section 100 is shown as contacting the top of pin head 170. Front section 100 is maintained in the off position by depression pin 130. Depression pin 130 ensures that the operator does not inadvertently cause depression of front section 100, thereby causing pin head 132 to be depressed and result in an inadvertent start signal being sent to the TIG welder W. Pin spring 174 also biases pin head 170 in the deactivation position so as to also prevent inadvertent activation of the start switch.

Referring now to FIG. 3, the solid lines of the pedal illustrate the pedal in the intermediate position, and the dotted line illustrates the pedal in the on position. The pedal is moved to the intermediate position by the operator applying a downward force on toe T of shoe S as shown by the force arrow. The downward force from toe T causes front section 100 to pivot counter clockwise about pin 30 and to move in contact with top surface 140 of back section 102. Pin head 132 of depression pin recesses into threaded body 134 when sufficient force is applied by the operator onto front section 100. As front section 100 pivots about depression pin 130, bottom surface 112 forces the pin head 170 downwardly, thereby causing pin spring 174 to compress and pin contact 176 forming an electrical connection with wire contacts 178, 179. Upon forming an electrical connection between wire contacts 178, 179, start switch 60 is shifted from the deactivation position to the activation position. Front section 100 and back section 102 are caused to be pivoted about pin 30 when bottom surface 112 contacts top surface 140 of back section 102. Pedal spring 50 is selected to have a sufficient compression rating to prevent back section 102 from pivoting counter clockwise about pin 30 while pedal front section 100 compresses pin head 170 and pivots about pin 30.

The start switch 60, upon being shifted to the activation position, causes a start signal to be sent through signal wire 66 to TIG welder W. TIG welder W, upon receiving the start signal, begins the activation sequence for arc ignition. The release of pin head 132 from pin depression 158, and the contact of front section 100 on back section 102 creates a tactile signal through the foot of the operator to inform the operator that the start switch 60 has been activated. This tactile indicator allows the operator to only activate the start switch without further depressing pedal 10. The force necessary to cause depression pin 130 to recess into threaded body 134 in combination with a force to cause pin spring 174 to compress is less than the force necessary to cause pedal spring 50 to compress. As a result, the operator encounters different resistances when causing the pedal front section 100 and pedal back section 102 to move. The operator also encounters a different resistance during the "rocking" of the foot pedal. These different resistances and foot actions function as an additional indicator of the position of the pedal so that the operator does not inadvertently over compress the pedal when attempting to initiate the start-up sequence and/or inadvertently over releasing the foot pedal thereby causing deactivation of the arc. The operator ensures that the minimum current level (e.g. 10–15 amps) is selected once the arc is initiated by maintaining a downward force on the heel of the shoe while the toe of the shoe depresses the front section 100.

Current control 70 sends a signal through control signal wire 78 to TIG welder W to cause the output current between the welding electrode and the workpiece to be at the minimum current level after start switch 60 has been shifted from the deactivation position to the activation position. This minimum current level is maintained so long as the potentiometer 72 is positioned at the minimum position as shown by the solid lines in FIG. 3. This minimum position of the potentiometer results in a low voltage signal being sent to current control 70. This low voltage signal is interpreted by current control 170 to send a control signal to the TIG welder to generate a minimum output current. As shown in the dotted lines of FIG. 3, when further force is applied by the operator through toe T and the simultaneous release of force from heel H, the additional force causes back section 102 to begin pivoting about pin 30. As back section 102 pivots counterclockwise about pin 30, pedal spring 50 is compressed and potentiometer 72 moves to a position causing an increased voltage signal to be sent to current control 70 as shown by the dotted lines in FIG. 3. As back section 102 is pivoted in the counter clockwise direction, start switch 60 is maintained in the activation position. The movement of the potentiometer to the maximum position results in an increase voltage signal to current control 70, thereby causing current control 70 to send a control signal to the TIG welder to generate a higher output current level. The operator, during the welding process, can increase the output welding current to a maximum output current level though the welder by exerting additional force through toe T and simultaneously releasing force from heel H to cause further counter clockwise pivoting of plate back section 102 or can decrease the output welding current to a minimum output current level by exerting a force through heel H and simultaneously releasing force from toe T and allowing pedal spring 50 to decompress to cause clockwise rotation of plate back section 102 about pin 30. This pedal design allows the operator to conveniently and easily pivot or "rock" the foot pedal about pin 30 to cause the current level to increase and decrease as desired during the welding process. So long as the operator maintains sufficient force on plate front section 100 via toe T, the arc will not be extinguished when the foot pedal is "rocked."

During the clockwise and counter clockwise pivoting of plate back section 102 ("rocking"), the operator maintains sufficient force at toe T to maintain pedal front section 100 in contact with pedal back section 102 so that the start switch stays in the activation position. When the welding operation is completed and the welder is to be deactivated, the operator simply exerts a force on the heel of shoe S while simultaneously releasing the force on toe T to cause back plate section 102 to fully pivot clockwise back to the intermediate position until the back plate section stops pivoting about pin 30, thereby resulting in a minimum output current level being generated through the arc welder. The operator then lifts his or her toe off pedal front section 100 resulting in the pedal front section to pivot clockwise about pin 30. Pin spring 174 is designed to exert a sufficient force on pin base 172 to cause pin head 170 to rise upwardly and cause pedal front section 100 to pivot counter clockwise on pin 30 when the operator removes his or her shoe from the pedal. The upward movement of pin head 170 causes pin contact 176 to break the electrical connection between wire contacts 178, 179 resulting in start switch 60 shifting from the activation position to the deactivation position, thereby causing the arc on the TIG welder to extinguish. As can be appreciated, the welding control system for the TIG welding can include an automatic arc shut off sequence. This shut down sequence can be initiated by the current control receive a minimum voltage signal from potentiometer 72 for a preselected period of time. One such automatic shut off sequence can include crater control of the current wherein the current is slowly reduced below the minimum current level over a predetermined period of time.

The improved foot pedal design overcomes past TIG foot pedal limitations. The improved foot pedal provides a design having independent tactile feel so that an operator can determine where the arc start switch activation occurs prior to increasing the output current. In addition, the control pedal of the present invention also prevents inadvertent deactivation of the arc welder during a welding operation. The control pedal of the present invention provides independent tactile distinction and different foot action between the activation of the start switch and the increase and/or decrease of the output current to the welder, thereby enabling an operator to consistently start the TIG welder and consistently maintain output current at a minimum level. The improved foot control pedal also enables an operator to consistently increase and decrease the output current ("rocking") without concern of inadvertently deactivating the TIG welder. Several of the advantages of the improved foot pedal are set forth below, namely 1) the arc start toe activation and heel pressure is used to keep the output control pedal at a minimum position after arc initiation, 2) the "at rest" arc start pedal position uses a detent type latch to maintain enough surface tension to alleviate accidental activation while the operator's foot rests on the pedal while not welding, 3) the front section of the pedal has a lighter pressure threshold than the back section pedal so as to maintain switch activation while lowering the back section, 4) the pivot point of the front and back sections is located under the arch of the foot so as to facilitate the ease which the operator can pivot the back section about pin 30, 5) the output current is decreased by relieving toe pressure while lowering heel position, and the minimum current output pedal position is sensed when back section 102 reaches its fill clockwise position where heel stops and the toe pressure on the arc start pedal is maintained so as to maintain the start switch in the activation position until such time the operator decides to deactivate the welder by releasing toe pressure on the pedal to allow the pedal to move to the "at rest" detent position, and 6) the adjustable heel stop aids in setting and maintaining consistency of the most comfortable user position for the control pedal pivot point, and also serves to aid in the user positioning or repositioning the foot pedal location on the floor.

The invention has been described with reference to a preferred embodiment and alternates thereof. It is believed that many modifications and alterations to the embodiments disclosed will readily suggest itself to the those skilled in the art upon reading and understanding the detailed description of the invention. It is intended to include all such modifications and alterations insofar as they come within the scope of the present invention.

I claim:

1. A control pedal for a welder that controls the output current level of the welder comprising a pedal, a start switch, and a current level controller, said pedal movable between an off position, an intermediate position, and an on position, said start switch adapted to generate a start signal that initiates a welder startup sequence when said start switch is shifted from a deactivation position to an activation position, said current level controller adapted to generate a control signal resulting in said output current level varying between a minimum and a maximum current level, said start switch being in said deactivation position when said pedal is in said off position, said start switch being in said activation position and said output current level producing said control signal resulting in said output current level being maintained at said minimum level when said pedal is in said intermediate position, said start switch being in said activation position and said output current level producing said control signal resulting in said output current level being maintained above said minimum current level when said pedal is in said on position, said pedal being a foot pedal that is adapted to receive a foot and to be moved by said foot between said off position, said intermediate position, and said on position, said pedal including a first section and a second section that move independent of one another, said first section being adapted to cause said start switch to shift between said activation and said deactivation positions and said second section being adapted to cause said current level controller to generate a signal resulting in said output current level to vary between said minimum and said maximum current level.

2. The control pedal as defined in claim 1, wherein said first section is movable between a first and second position independent of the movement of said second section of said pedal, said start switch being in said deactivation position when said first section is in said first position, said start switch being in said activation position when said first section is in said second position.

3. The control pedal as defined in claim 2, wherein said second section is movable between a first and second position independent of the movement of said first section of said pedal, said first position of said second section causing said output current level to produce said control signal resulting in said output current level being maintained at said minimum level.

4. The control pedal as defined in claim 3, wherein said second section is movable between a first and second position independent of the movement of said first section of said pedal, said second position of said second section causing said output current level to produce said control signal resulting in said output current level being maintained at said maximum level.

5. The control pedal as defined in claim 4, wherein said first section and said second section pivot about the same axis.

6. The control pedal as defined in claim 4, wherein said first section is moved between said first and said second position by only by a toe of said foot.

7. The control pedal as defined in claim 6, wherein said second section is moved between said first and said second position by a toe of said foot.

8. The control pedal as defined in claim 7, wherein said second section is moved between said first and said second position by a heel of said foot.

9. The control pedal as defined in claim 4, wherein said second section is moved between said first and said second position by a toe of said foot.

10. The control pedal as defined in claim 1, wherein said first section is movable between a first and second position independent of the movement of said second section of said pedal, said first section causing said start switch to shift between said activation and said deactivation positions, said start switch being in said deactivation position when said first section is in said first position, said start switch being in said activation position when said first section is in said second position.

11. The control pedal as defined in claim 10, wherein said second section is movable between a first and second position independent of the movement of said first section of said pedal, said first position of said second section causing said output current level to produce said control signal resulting in said output current level being maintained at said minimum level.

12. The control pedal as defined in claim 11, wherein said second section is movable between a first and second position independent of the movement of said first section of said pedal, said second position of said second section causing said output current level to produce said control signal resulting in said output current level being maintained at said maximum level.

13. The control pedal as defined in claim 12, wherein said first section and said second section pivot about the same axis.

14. The control pedal as defined in claim 1, wherein said second section is movable between a first and second position independent of the movement of said first section of said pedal, said first position of said second section causing said output current level to produce said control signal resulting in said output current level being maintained at said minimum level.

15. The control pedal as defined in claim 1, wherein said second section is movable between a first and second position independent of the movement of said first section of said pedal, said second position of said second section causing said output current level to produce said control signal resulting in said output current level being maintained at said maximum level.

16. The control pedal as defined in claim 1, wherein said first section and said second section pivot about the same axis.

17. The control pedal as defined in claim 1, wherein said start switch is biased in said deactivation position.

18. The control pedal as defined in claim 1, wherein said welder is a TIG welder.

19. The control pedal as defined in claim 1, wherein said pedal is biased in said off position by a biasing member.

20. The control pedal as defined in claim 1, wherein said current level controller includes a potentiometer.

21. The control pedal as defined in claim 1, wherein both said first section has a top surface and said second section has a top surface, said top surfaces being adapted to make direct contact with said foot.

22. A control pedal for a welder that controls the output current level of the welder comprising a pedal, a start switch, and a current level controller, said pedal movable between an off position, an intermediate position, and an on position, said start switch adapted to generate a start signal that initiates a welder startup sequence when said start switch is shifted from a deactivation position to an activation position, said current level controller adapted to generate a control signal resulting in said output current level varying between a minimum and a maximum current level, said start switch being in said deactivation position when said pedal is in said off position, said start switch being in said activation position and said output current level producing said control signal resulting in said output current level being maintained at said minimum level when said pedal is in said intermediate position, and said start switch being in said activation position and said output current level producing said control signal resulting in said output current level being maintained above said minimum current level when said pedal is in said on position, wherein said pedal is a foot pedal that is adapted to receive a foot and to be moved by said foot between said off position, said intermediate position, and said on position, said pedal including an adjustable heel section adapted to adjust the length of said pedal.

23. The control pedal as defined in claim 22, wherein said heel section includes an abutment flange extending upwardly from an end of said heel section, said abutment flange adapted to inhibit movement of a heel of said foot off said end of said heel section.

24. A control pedal for a welder that controls the output current level of the welder comprising a pedal, a start switch, and a current level controller, said pedal movable between an off position, an intermediate position, and an on position, said start switch adapted to generate a start signal that initiates a welder startup sequence when said start switch is shifted from a deactivation position to an activation position, said current level controller adapted to generate a control signal resulting in said output current level varying between a minimum and a maximum current level, said start switch being in said deactivation position when said pedal is in said off position, said start switch being in said activation position and said output current level producing said control signal resulting in said output current level being maintained at said minimum level when said pedal is in said intermediate position, and said start switch being in said activation position and said output current level producing said control signal resulting in said output current level being maintained above said minimum current level when said pedal is in said on position, said pedal including a first section and a second section that move relative to one another, said first section adapted to cause said start switch to shift between said activation and said deactivation positions, said second section adapted to cause said current level controller to generate a signal resulting in said output current level to vary between said minimum and said maximum current level, said first section of said pedal including a safety engagement adapted to resist unintentional movement of said first section to avoid causing said start switch to shift from said deactivation position to said activation position.

25. The control pedal as defined in claim 24, wherein said safety engagement includes a depressable pin.

26. A method of activating a welder and controlling the output current level of the welder comprising:
   a. providing a pedal movable between an off position, an intermediate position, and an on position, said pedal including a first top section, a second top section, a start switch, and a current level controller, said start switch adapted to initiate a startup sequence for said welder, said current level controller producing a signal resulting in said output current level varying between a minimum and a maximum current level, said first top section and second top section being adapted to move independent of one another;
   b. moving said first top section from said off position to said intermediate position to cause said start switch to shift to said activation position thereby initiating said welder startup sequence; and
   c. subsequently moving said second top section between said intermediate position and said on position to cause said current level controller to produce a signal that results in said output current level varying between a minimum level and a maximum level.

27. The method as defined in claim 26, including the step of moving said pedal from said on position to said intermediate position and maintaining said pedal at said intermediate position for a period of time.

28. The method as defined in claim 27, including the step of deactivating said welder by maintaining said pedal at said intermediate position for a predetermined period of time to cause said welder to begin an arc shut down sequence.

29. The method as defined in claim 26, wherein said first top section and said second top section are adapted to make direct contact with said foot.

* * * * *